United States Patent Office 3,220,979
Patented Nov. 30, 1965

3,220,979
PREPARATION OF AROMATIC PHENOLS
Edward J. McNelis, Wallingford, Pa., assignor to Sun Oil Company, Philadelphia, Pa., a corporation of New Jersey
No Drawing. Filed Mar. 27, 1964, Ser. No. 355,487
38 Claims. (Cl. 260—47)

This application is a continuation-in-part of copending application Serial No. 243,997, filed December 12, 1962.

This invention relates to aromatic compounds and a method for preparing the same. More particularly, it relates to a method for preparing aromatic compounds having the general formula

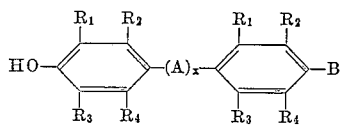

wherein $R_1$, $R_2$, $R_3$ and $R_4$ are selected from the group consisting of hydrogen, halogen, alkoxy and alkyl radicals containing from 1 to 3 carbon atoms and oxidized alkyl radicals containing from 1 to 3 carbon atoms. A is a radical selected from the group consisting of

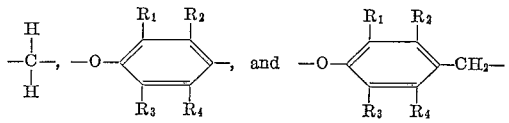

$x$ is an integer from 0 to 20,000. B is selected from the group consisting of hydrogen, methyl, hydroxyl, hydroxymethyl and halogen. When A is —$CH_2$—, $x$ is 1.

The various aromatic compounds produced in accordance with the methods of the instant invention have for the most part been prepared heretofore. Certain of the compounds described herein are in themselves novel compounds.

Briefly, stated, the instant invention comprises contacting a material having the general formula

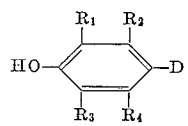

wherein D is selected from the group consisting of hydrogen, methyl, hydroxymethyl and halogen, with activated manganese dioxide at a temperature in the range of 20° C. to 360° C. for a period of time in the range of from 5 minutes to 25 hours and thereafter recovering the desired aromatic compound.

From the above general description of the instant invention it is readily apparent that one type of aromatic compound produced in accordance herewith is an aromatic polyether.

Aromatic polyethers of high molecular weight are of value as thermoplastic resins which may be extruded or molded at elevated temperatures and pressures to form solid rigid materials which are insoluble in most solvents. The lower molecular weight materials find particular utility as insecticides, fuel and lubricant additives and plasticizers. Heretofore these types of materials have been prepared by a number of methods such as the well known Ullman synthesis as described and referred to in Synthetic Organic Chemistry by Wagner and Zook, John Wiley and Sons (1953), page 227 and references cited therein. Briefly, that method involves treating an alkali metal salt of a phenol with an aryl halide or polyhalide in the presence of a catalyst such as copper at temperatures ranging between 200° C. and 300° C. for 0.5 hour to 10 hours, pouring the hot mixture into a solvent such as toluene or xylene, filtering the insoluble alkali metal halide, washing with aqueous caustic to remove excess phenol, and removing the solvent by distillation or evaporation to isolate the polyphenyl ether or derivatives thereof.

In preparing the aromatic polyethers in accordance with the instant invention a phenol or substituted phenol as described above is reacted with activated manganese dioxide.

"Activated manganese dioxide" is a well known material (see Evans, Quarterly Reviews, 13, pp. 61–70, 1959). It is a form of hydrated manganese dioxide and is generally prepared by reacting manganese sulfate with potassium permanganate in a hot aqueous solution in the presence of sufficient alkali to insure that the reaction mixture remains alkaline. After being washed with water, the resulting slurry is dried at 100–120° C. and activated manganese dioxide is recovered. It can also be prepared by reacting manganese sulfate and potassium permanganate in a hot aqueous solution in the absence of any alkali. The resulting mixture becomes strongly acidic and after drying the slurry at 100–120° C., activated manganese dioxide is recovered. Activated manganese dioxide is also prepared by heating manganese oxalate or manganese carbonate at 250° C. The resulting product may be used as produced or it can be washed with dilute aqueous nitric acid and subsequently dried at 230° C.

In addition to the preparation of aromatic polyethers, the instant invention also encompasses the preparation of certain bis(tetraalkylhydroxyphenyl)methanes and tetraalkyldihydroxybiphenyls. These latter types of compounds find particular utility as antioxidants. Numerous methods for preparing substituted tetramethyldiphenylmethanes, particularly 4,4'-dihydroxy-3,3',5,5'-tetramethyldiphenylmethanes, have been reported in the literature. For example, this material has been prepared by reacting 2,6-xylenol and formaldehyde in the presence of a basic material. More recently it has been prepared from mesitol by the action of hydrogen peroxide and ferrous sulfate.

Suitable starting materials which can be used to prepare the aromatic compounds in accordance with the instant invention as stated above have the general formula

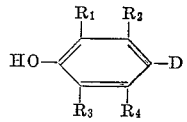

wherein $R_1$, $R_2$, $R_3$ and $R_4$ are selected from the group consisting of hydrogen, halogen, alkoxy and alkyl radicals containing from 1 to 3 carbon atoms, D is selected from the group consisting of hydrogen, methyl, hydroxymethyl and halogen. Examples of specific compounds include phenol, 2,6-xylenol, 2,3,5,6-tetramethylphenol, 2,6-dimethoxyphenol, mesitol, 4-bromo-2,6-xylenol, 2,6-dimethyl-4-hydroxymethylphenol and 2,6-dichlorophenol.

As stated above the production of aromatic compounds in accordance with this invention is accomplished by contacting a phenol or substituted phenol with activated manganese dioxide. The use of activated manganese dioxide is critical to the success of this invention since ordinary manganese dioxide is not operable herein. The phenol or substituted phenol can be contacted with the activated manganese dioxide either in the presence or absence of a solvent and in the presence or absence of a free oxygen containing gas such as air. Under certain conditions the presence of the free oxygen containing gas will influence the final product produced. In addition, as will be explained more fully hereinafter, the particular solvent used in certain instances will influence the final product.

It is preferred that prior to heating the phenol or substituted phenol in the presence of the activated manganese dioxide, that it be dissolved in a suitable solvent and that the activated manganese dioxide be added to the resulting solution. Examples of suitable solvents include chloroform, acetone, benzene, toluene, nitrobenzene and dimethylformamide. Chloroform and benzene are the preferred solvents.

In the preparation of the polyethers, if the phenol or substituted phenol is heated in the presence of activated manganese dioxide in the absence of air, there are produced relatively low molecular weight polymeric products ranging from liquids to solids. The molecular weight of these materials generally will range between about 1000 and 10,000.

If, however, higher molecular weight materials are desired, the phenol or substituted phenol is heated with the activated manganese dioxide in the presence of air or oxygen. The polymeric products so produced have a molecular weight of the order of magnitude of 20,000.

The temperature at which either the phenol or substituted phenol-activated manganese dioxide mixture or solution of phenol or substituted phenol-activated manganese dioxide mixture is heated can vary over a wide range. It has been found that substantial amounts of aromatic products are produced at a temperature as low as 20° C. If the phenol or substituted phenol is not contained in a solvent, the maximum temperature at which the reaction mass can be heated is governed only by the decomposition temperature of the phenol or substituted phenol. If the phenol or substituted phenol is dissolved in a solvent prior to the addition thereto of the activated manganese dioxide, the maximum temperature at which the reaction mass can be heated is governed by the boiling point of the solvent at the pressure used. While temperatures in the range of from about 20° C. to as high as 360° C. can be used in this invention, it is preferred that a temperature in the range of from 60° C. to 225° C. be used.

The time that the reaction mixture is heated can vary between 5 minutes and 25 hours. It is preferred that the heating time range between about 0.5 hour and 2 hours.

The molar ratio of activated manganese dioxide to phenol or derivative thereof can also vary over wide limits. It has been found that if trace amounts of activated manganese dioxide are present in the reaction mass, there is produced some aromatic product. It is preferred, however, that in order to optimize the amount of product, the molar ratio of activated manganese dioxide to phenol or substituted phenol should range between about 0.5 to 1 and 100 to 1, with a molar ratio ranging between about 3:1 and 10:1 being most preferred.

As stated above, the use of certain particular solvents influences the type of product produced. This is particularly true when using mesitol as the starting material in the instant invention. More specifically, when using mesitol as the starting material and chloroform or acetone as the solvent there is produced inter alia a polyether having the formula

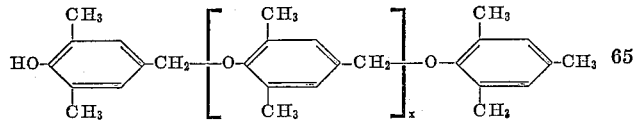

If however, benzene is used as the solvent there is produced inter alia a polyether having the formula

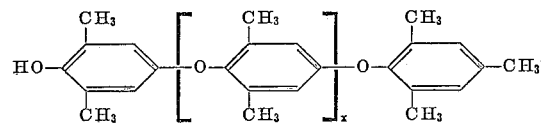

It is of interest to note that regardless of the type of polyether produced using mesitol and the different solvents, in each case there is produced some 4,4'-dihydroxy-3,3',5,5'-tetramethyldiphenylmethane.

The following examples serve to further illustrate the instant invention:

EXAMPLE I

To 33.6 millimoles of 2,6-xylenol dissolved in 50 ml. of benzene there were added 100 millimoles of reagent grade manganese dioxide (pyrolusite). The resulting mixture was heated at reflux temperature for 2 hours under an atmosphere of nitrogen. At the end of the reaction time the mixture was separated by filtration and the filtrate was evaporated to dryness. The residue was dissolved in 250 ml. of ether and treated with 100 ml. of 5% aqueous sodium hydroxide. The aqueous phase was separated from the organic phase and acidified with HCl. The aqueous solution was extracted with 300 ml. of ether and the ether extract was evaporated to dryness. There was recovered an essentially quantitative amount of material which upon analysis proved to be 2,6-xylenol, thus indicating that unactivated manganese dioxide is ineffective in preparing aromatic polyethers in accordance with the instant invention.

EXAMPLE II

To 33.6 millimoles of 2,6-xylenol dissolved in 50 ml. of chloroform there were added 100 millimoles of activated manganese dioxide. The resulting mixture was heated at reflux temperature for 2 hours under an atmosphere of nitrogen. At the end of the reaction time the mixture was filtered and upon evaporation of the filtrate there was recovered an oil which contained the polymeric product and unreacted 2,6-xylenol. This oily product was dissolved in 250 ml. of ether. The resulting solution was treated with 100 ml. of 5% sodium hydroxide. The ether layer was separated from the aqueous phase and evaporated to dryness. The residue resulting therefrom was dissolved in a minimum amount of chloroform and poured into excess methanol. The resulting precipitate was collected and identified as a polymeric material symmetrically substituted in the 4-position by infrared and nuclear magnetic resonance analysis. Elemental analysis substantiated an empirical formula of $(C_8H_8O)_n$. This material had a carbon content of 79.15%, a hydrogen content of 6.85%, and an oxygen content of 13.10% as compared with theoretical values of 80.00%, 6.67%, and 13.33% respectively. The yield of polymer was 79% of theory. The polymer had a melting range of 170–176° C. and a molecular weight of 1527 as determined by ebullioscopic methods.

EXAMPLE III

Example II was repeated with the exception that a variety of solvent materials were used and the different mixtures were heated for varying lengths of time. The data presented in Table I were compiled as a result of these experiments.

*Table I*

| Solvent (ml.) | Reaction Temp. (°C.) | Reaction Time (Hr.) | Polymer Yield (percent) | Solid Polymer Melting Range, °C. | Solid Polymer Molecular Weight |
|---|---|---|---|---|---|
| CHCl₃ (50) | Reflux | 4 | 88 | | 1,921 |
| Toluene (50) | do | 0.5 | 85 | 157–166 | 1,188 |
| Do | do | 2 | 70 | 156–165 | 1,202 |
| Do | Room Temp. | 2 | 62 | 155–161 | 1,252 |
| Do | Reflux | 7 | 82 | 233–248 | |
| Benzene (50) | do | 2 | 93 | 176–182 | 1,816 |
| Nitrobenzene (50) | do | 2 | 91 | 170–175 | 1,416 |
| DMF (50) | do | 2 | 78 | 138–144 | |

EXAMPLE IV

Example II was repeated with the exception that toluene was used as the solvent and the molar ratios of activated manganese dioxide to 2,6-xylenol were also varied. The data shown in Table II were compiled as a result of this series of experiments.

*Table II*

| Millimoles Activated $MnO_2$ | Polymer Yield (percent) | Solid Polymer Melting Range, °C. | Solid Polymer Molecular Weight |
|---|---|---|---|
| 10 | 41 | | |
| 100 | 70 | 156–165 | 1,202 |
| 200 | 68 | >275 | 8,916 |

EXAMPLE V

Example II was repeated except that air was blown through the activated manganese dioxide-2,6-xylenol reaction mixture during the heating period. There was recovered a solid polymer in a 25% yield having a melting range of 247° C. to 250° C. It had an intrinsic viscosity of 0.47 ($CHCl_3$/30° C.). The molecular weight of this material based on intrinsic viscosity was about 20,000.

EXAMPLE VI

To 3.1 g. of phenol dissolved in 50 ml. of chloroform there were added 8.7 g. of activated manganese dioxide. The resulting mixture was heated at reflux temperature for 2 hours. At the end of the reaction time the mixture was filtered and the filtrate evaporated to dryness. The residue was dissolved in 100 ml. of methanol and poured into water. There was formed an emulsion which was extracted with 100 ml. of ether and 100 ml. of chloroform. Upon evaporation of the solvents there were recovered 60 mg. of phenol. The emulsion was broken by the addition thereto of magnesium sulfate. Extraction with 100 ml. of ether after the breaking of the emulsion and subsequent evaporation of the ether extract produced an oily residue. The oil was dissolved in a minimum amount of chloroform and poured into excess petroleum ether (B.P. 30–60° C.). The precipitate which was formed was separated by filtration. While it had no sharply defined melting point it softened at 140° C. and melted completely at 170° C. It was insoluble in 5% aqueous sodium hydroxide. Upon elemental analysis, it had a carbon content of 77.08%, a hydrogen content of 5.12%, and an oxygen content of 17.93%, as compared with theoretical values of 78.25%, 4.25%, and 17.40% respectively, thus indicating an empirical formula of $(C_6H_4O)_n$. The molecular weight of this material as determined by the osmometric technique was 2100.

EXAMPLE VII

To 5.65 g. of 2,3,5,6-tetramethylphenol dissolved in 50 ml. of benzene there were added 8.7 g. of activated manganese dioxide. The resulting mixture was heated at reflux temperature for 2 hours under nitrogen. The product was worked up in accordance with the procedure set forth in Example II and there was recovered a white solid material having a melting range of 171–176° C. An elemental analysis of this material showed a carbon content of 80.17%, a hydrogen content of 8.14%, and an oxygen content of 11.18%, as compared with theoretical values of 81.00%, 8.10%, and 10.90% respectively, thus substantiating an empirical formula of $(C_{10}H_{12}O)_n$. This material had a molecular weight as determined by osmometric techniques of 1667.

EXAMPLE VIII

To 5.24 g. of 2,6-dichlorophenol dissolved in 50 ml. of benzene there were added 8.7 g. of activated manganese dioxide. The resulting mixture was heated at reflux temperature for two hours under an atmosphere of nitrogen. The product was worked up in accordance with the procedure set forth in Example II. There was recovered a solid polymer having a melting range of 150–155° C.

EXAMPLE IX

To 5.14 g. of 2,6-dimethoxyphenol dissolved in 50 ml. of toluene there were added 8.7 g. of activated manganese dioxide. The resulting mixture was refluxed for 2 hours under an atmosphere of nitrogen. The toluene was then removed and the residue was dissolved in 150 ml. of chloroform and treated with 50 ml. of 5% aqueous sodium hydroxide. The chloroform layer was separated and evaporated to dryness. The residue was redissolved in 20 ml. of chloroform and poured into excess methanol. The resulting precipitate which was collected had a melting range of 184–192° C. and a molecular weight of 2443. This material upon elemental analysis had a carbon content of 62.23%, a hydrogen content of 5.31%, and an oxygen content of 30.92% as compared with theoretical values calculated for $(C_8H_8O_3)_n$ of 63.00%, 5.27% and 31.60% respectively.

EXAMPLE X

A solution of mesitol (4.53 g.) in benzene (50 ml.) was contacted with activated manganese dioxide (8.70 g.) under a nitrogen atmosphere for two hours. The solution was refluxed during this time. After cooling and filtration the benzene solution was washed with a 5% sodium hydroxide solution (100 ml.). The benzene solution was evaporated to a residue weighing 2.2512 g. The residue was treated with 150 ml. petroleum ether, which dissolved 0.212 g. of a material whose infrared spectrum was identical to that of mesitol. The remaining residue had the same infrared spectrum as that of authentic 2,6-xylenol polymer.

The basic solution from above was acidified and extracted with ethyl ether. The ether solution was dried over magnesium sulfate and stripped to a residue weighing 1.14 g. This residue was treated with 300 ml. of petroleum ether, which dissolved 0.585 g. of unreacted mesitol. The residue, whose mass spectrum had a major peak of 256, was crystallized from benzene/petroleum ether to melt at 175–6° C. Its melting point was undepressed by admixture with authentic 4,4'-dihydroxy-3,3',5,5'-tetramethyldiphenylmethane prepared from 2,6-xylenol and formaldehyde.

The polymer yield was 54%; the diphenylmethane yield was 15%.

EXAMPLE XI

A solution of mesitol (4.53 g.) in benzene (50 ml.) was heated to reflux. Activated manganese dioxide (8.7 g.) was added. A stream of air was blown through this mixture for two hrs. After cooling and filtration the benzene solution was washed with a 5% sodium hydroxide solution (100 ml.). The benzene solution was evaporated to a residue weighing 6.57 g. The infrared spectrum of this residue and the base insolubility of the polymer indicate that this substance is a polymer with the 2,6-xylenol polymer backbone but its methyl groups have been randomly oxidized to alcohol and aldehyde groups.

The basic solution from above was acidified and extracted with ethyl ether. The ether solution was dried over magnesium sulfate ad stripped to a residue weighing 0.398 g. Its infrared spectrum was basically the same as the aforementioned residue.

EXAMPLE XII

A solution of mesitol (4.53 g.) in benzene (50 ml.) was heated to reflux over activated manganese dioxide (17.40 g.) for four hours in a nitrogen atmosphere. Work-up procedure was as per Example X. The non-base soluble portion weighed 3.594 g. and had the same infrared spectrum as the 2,6-xylenol polymer. A chromatography of this substance on acid-washed alumina did not change the infrared spectrum of this substance. The nuclear magnetic resonance spectrum of this chromatographed material was the same as that of the 2,6-xylenol polymer.

The yield of non-chromatographed polymer was 79.5%.

EXAMPLE XIII

A solution of mesitol (4.53 g.) in benzene (50 ml.) was heated to reflux over activated manganese dioxide (4.35 g.) for four hours in a nitrogen atmosphere. Work-up procedure was as per Example X. The non-base solubles weighed 1.915 g. The base soluble material weighed 1.830 g. The latter was a mixture which was separated into two components by solubility in petroleum ether. The petroleum-ether soluble portion was mesitol and weighed 0.454 g. The remainder was 4,4' - dihydroxy - 3,3',5,5' - tetramethyldiphenylmethane, which was identified by infrared, ultraviolet and VPC comparisons with an authentic sample. The yield of this compound was 30%.

EXAMPLE XIV

A solution of mesitol (18.02 g.) in benzene (200 ml.) was heated to reflux over activated manganese dioxide (34.8 g.) overnight in a nitrogen atmosphere (50 p.s.i.). The polymeric material described in Example X was isolated in 27% yield. The base soluble portion of the reaction products weighed 3.58 g. one gram of which was mesitol. The remainder was an approximately equimolar mixture (according to infrared and mass spectral analyses) of 4,4' - dihydroxy - 3,3',5,5'-tetramethyldiphenylmethane and 1,2-[4,4' - dihydroxy - 3,3',5,5' - tetramethyldiphenyl] ethane.

EXAMPLE XV solution of mesitol (4.083 g.) in chloroform (50 ml.) was heated to reflux over activated manganese dioxide (17.4 g.) for four hours in a nitrogen atmosphere. After cooling and filtration the chloroform solution was stripped of solvent. The residue was treated with ether. This polymeric material which was not ether soluble weighed 0.216 g. Its nuclear magnetic resonance spectrum has peaks at 2.3 p.p.m. (relative to tetramethylsilane), 4.7 p.p.m. and 6.85 p.p.m. The NMR pattern of 4-hydroxymethyl-2,6-xylenol, a model compound for a polymesitol has peaks at 2.25 p.p.m., 4.55 p.p.m. and 6.95 p.p.m.

EXAMPLE XVI

A solution of mesitol (4.08 g.) in 50 ml. of an acetone-water mixture (90/10) was heated to reflux over activated manganese dioxide for two hours in a nitrogen atmosphere. After cooling and filtration, the residual manganese dioxide was washed with chloroform to give a residue weighing 0.124 g. This polymeric material had the same spectral properties as the substance in Example XV.

EXAMPLE XVII

A solution of 4-bromo-2,6-xylenol (6.02 g.) in chloroform (50 ml.) was refluxed for two hours in a nitrogen atmosphere over activated manganese dioxide (8.7 g.). After cooling and filtration, the chloroform filtrate and washings (200 ml.) were evaporated leaving a dark gummy residue. The residue was extracted with diethyl-ether. The ether solution was extracted with 100 ml. of a five percent sodium hydroxide solution. Upon evaporation of the ether solution there was recovered a buff colored powder weighing 0.438 g. The infrared spectrum and NMR of this powder was substantially identical to that of the polymer produced in Example II. This material had an elemental analysis of C, 71.27%; H, 6.11%; O, 13.08% and a molecular weight of 2108.

EXAMPLE XVIII

Example XVII was repeated except that 2,6-dimethyl-4-hydroxymethylphenol (3.69 g.) was used instead of 4-bromo-2,6-xylenol. The polymeric product obtained had essentially the same infrared spectrum as the product of Example II.

EXAMPLE XIX

A solution of 2,6-xylenol (41 g.) in chloroform (350 ml.) was refluxed for five hours over activated manganese dioxide (8.7 g.) with an air stream bubbling through the solution. At the end of the reaction time the mixture was separated by filtration and the filtrate was washed with 200 ml. of five percent sodium hydroxide solution. Acidification of the basic wash produced a pink precipitate which was separated by filtration and dried. The solid material was extracted with petroleum ether (B.P. 30–60° C.) to remove any unreacted 2,6-xylenol. The remaining solid material was recrystallized from petroleum ether (B.P. 65–110° C.) and there was recovered a white powder having a melting point of 222–224° C. This material was identified as 4,4'-dihydroxy-3,3'-5,5'-tetramethylbiphenyl by a comparison of its infrared spectrum with that of authentic material prepared by the reduction of 3,3',5,5'-tetramethyldiphenoquinone with zinc and acetic acid. The melting point of the authentic material is 223–225° C. (B. O. Lindgren, Acta Chem. Scand. 14, 1208).

I claim:

1. Method for preparing aromatic compounds having the general formula

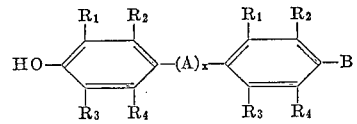

wherein $R_1$, $R_2$, $R_3$ and $R_4$ are selected from the group consisting of hydrogen, halogen, alkoxy and alkyl radicals containing from 1 to 3 carbon atoms, and oxidized alkyl radicals containing from 1 to 3 carbon atoms, A is selected from the group consisting of

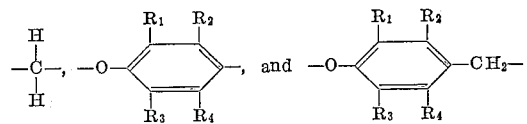

$x$ is an integer from 0 to 20,000, B is selected from the group consisting of hydrogen, methyl, hydroxyl, hydroxymethyl and halogen when A is

$x$ is 1, which comprises contacting a material having the general formula

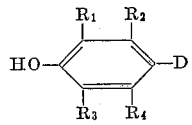

wherein D is selected from the group consisting of hydrogen, methyl, hydroxymethyl and halogen, with activated manganese dioxide at a temperature in the range of 20° C to 360° C. for a period of time in the range of from 5 minutes to 25 hours and thereafter recovering said aromatic compounds.

2. Method in accordance with claim 1 wherein the temperature is in the range of 60° C. to 225° C. and the time ranges between 0.5 hour and 2 hours.

3. Method for preparing aromatic compounds having the general formula

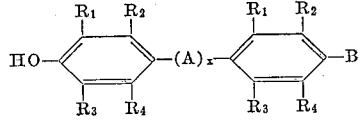

wherein $R_1$, $R_2$, $R_3$ and $R_4$ are selected from the group consisting of hydrogen, halogen, alkoxy, and alkyl radicals containing from 1 to 3 carbon atoms, and oxidized alkyl radicals containing from 1 to 3 carbon atoms, A is selected from the group consisting of

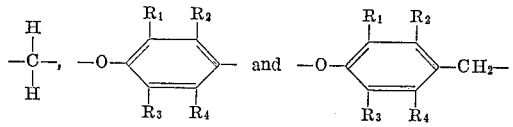

$x$ is an integer from 0 to 20,000, B is selected from the group consisting of methyl, hydroxyl, hydroxymethyl and halogen, when A is

$x$ is 1, which comprises contacting a material having the general formula

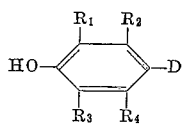

wherein D is selected from the group consisting of hydrogen, methyl, hydroxymethyl and halogen, with activated manganese dioxide in the presence of air at a temperature in the range of 20° C. to 360° C. for a period of time ranging between 5 minutes and 25 hours and thereafter recovering said aromatic compound.

4. Method in accordance with claim 3 wherein the temperature is in the range of 60° C to 225° C. and the time ranges between 0.5 hour and 2 hours.

5. Method for preparing aromatic compounds having the general formula

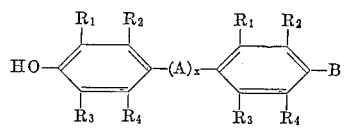

wherein $R_1$, $R_2$, $R_3$ and $R_4$ are selected from the group consisting of hydrogen, halogen, alkoxy, and alkyl radicals containing from 1 to 3 carbon atoms, and oxidized alkyl radicals containing from 1 to 3 carbon atoms, A is selected from the group consisting of

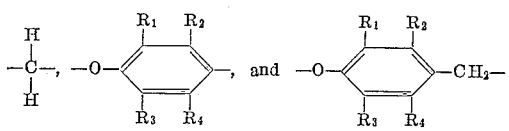

$x$ is an integer from 0 to 20,000, B is selected from the group consisting of methyl, hydroxyl, hydroxymethyl and halogen, when A is

$x$ is 1, which comprises dissolving in a solvent a material having the general formula

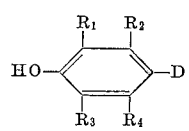

wherein D is selected from the group consisting of hydrogen, methyl, hydroxymethyl and halogen and contacting the resulting solution with activated manganese dioxide at a temperature in the range of 20° C. to 360° C. for a period of time ranging between 5 minutes and 25 hours and thereafter recovering said aromatic compound.

6. Method in accordance with claim 5 wherein said solvent is selected from the group consisting of chloroform, acetone, benzene, toluene, nitrobenzene, and dimethylformamide.

7. Method in accordance with claim 6 wherein the temperature is in the range of 60° C to 225° C. and the time ranges between 0.5 hour and 2 hours.

8. Method in accordance with claim 5 wherein the temperature is in the range of 60° C to 225° C. and the time ranges between 0.5 hour and 2 hours.

9. Method for preparing aromatic polyethers having the general formula

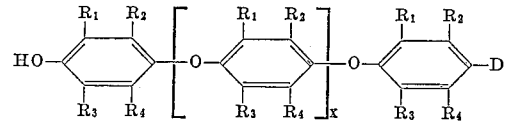

wherein $R_1$, $R_2$, $R_3$ and $R_4$ are selected from the group consisting of hydrogen, halogen, alkoxy, and alkyl radicals containing from 1 to 3 carbon atoms, and oxidized alkyl radicals containing from 1 to 3 carbon atoms, D is selected from the group consisting of hydrogen, methyl, hydroxymethyl and halogen, which comprises contacting a material having the general formula

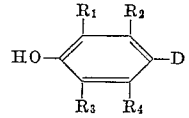

with activated manganese dioxide at a temperature in the range of 20° C. to 360° C. for a period of time ranging between 5 minutes and 25 hours and thereafter recovering said aromatic polyether.

10. Method in accordance with claim 9 wherein the temperature is in the range of 60° C. to 225° C. and the time ranges between 0.5 and 2 hours.

11. Method for preparing aromatic polyethers having the general formula

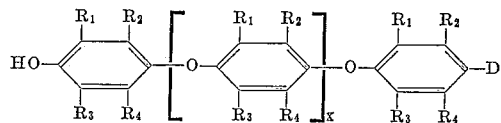

wherein $R_1$, $R_2$, $R_3$ and $R_4$ are selected from the group consisting of hydrogen, halogen, alkoxy, and alkyl radicals containing from 1 to 3 carbon atoms, and oxidized alkyl radicals containing from 1 to 3 carbon atoms, D is selected from the group consisting of hydrogen, methyl, hydroxymethyl, and halogen, which comprises contacting a material having the general formula

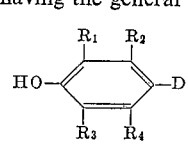

with activated manganese dioxide in the presence of air at a temperature in the range of 20° C. to 360° C. for a period of time ranging between 5 minutes and 25 hours and thereafter recovering said aromatic polyether.

12. Method in accordance with claim 11 wherein the temperature is in the range of 60° C. to 225° C. and the time ranges between 0.5 hour and 2 hours.

13. Method for preparing aromatic polyethers having the general formula

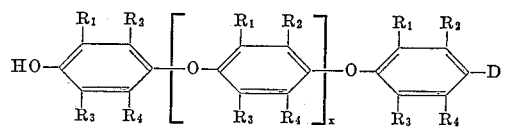

wherein $R_1$, $R_2$, $R_3$ and $R_4$ are selected from the group consisting of hydrogen, halogen, alkoxy, and alkyl radicals containing from 1 to 3 carbon atoms, and oxidized alkyl radicals containing from 1 to 3 carbon atoms, D is selected from the group consisting of hydrogen, methyl, hydroxymethyl and halogen, which comprises dissolving in a solvent a material having the general formula

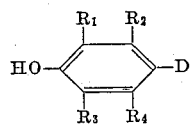

wherein D is selected from the group consisting of hydrogen, methyl, hydroxymethyl and halogen and contacting the resulting solution with activated manganese dioxide at a temperature in the range of 20° C. to 360° C. for a period of time ranging between 5 minutes and 25 hours and thereafter recovering said aromatic compound.

14. Method in accordance with claim 13 wherein said solvent is selected from the group consisting of chloroform, acetone, benzene, toluene, nitrobenzene, and dimethylformamide.

15. Method in accordance with claim 14 wherein the temperature is in the range of 60° C. to 225° C. and the time ranges between 0.5 hour and 2 hours.

16. Method in accordance with claim 13 wherein the temperature is in the range of 60° C. to 225° C. and the time ranges between 0.5 hour and 2 hours.

17. Method for preparing aromatic polyethers having the general formula

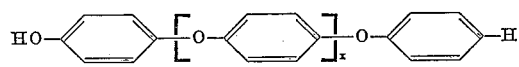

wherein $x$ is an integer greater than 0, which comprises dissolving phenol in a solvent and heating the resulting solution in the presence of from 0.5 to 100.0 moles of activated manganese dioxide per mole of phenol at a temperature ranging between 20° C. and 360° C. for a period of time ranging between 5 minutes and 25 hours and thereafter recovering said aromatic polyether.

18. Method in accordance with claim 17 wherein the molar ratio of activated manganese dioxide to phenol ranges between 3.0–1.0 and 10.0–1.0.

19. Method for preparing aromatic polyethers having the general formula

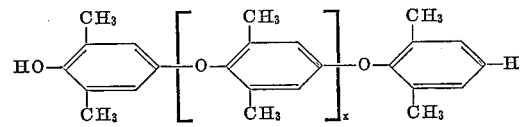

wherein $x$ is an integer greater than 0, which comprises dissolving 2,6-xylenol in a solvent and heating the resulting solution in the presence of from 0.5 to 100.0 moles of activated manganese dioxide per mole of 2,6-xylenol at a temperature ranging between 20° C. and 360° C. for a period of time ranging between 5 minutes and 25 hours and thereafter recovering said aromatic polyether.

20. Method in accordance with claim 19 wherein the molar ratio of activated manganese dioxide to 2,6-xylenol ranges between 3.0–1.0 and 10.0–1.0.

21. Method for preparing aromatic polyethers having the general formula

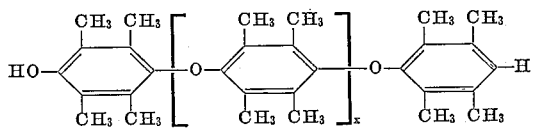

wherein $x$ is an integer greater than 0, which comprises dissolving 2,3,5,6-tetramethylphenol in a solvent and heating the resulting solution in the presence of from 0.5 to 100.0 moles of activated manganese dioxide per mole of 2,3,5,6-tetramethylphenol at a temperature ranging between 20° C. and 360° C. for a period of time ranging between 5 minutes and 25 hours and thereafter recovering said aromatic polyether.

22. Method in accordance with claim 21 wherein the molar ratio of activated manganese dioxide to 2,3,5,6-tetramethylphenol ranges between 3.0–1.0 and 10.0–1.0.

23. Method for preparing aromatic polyethers having the general formula

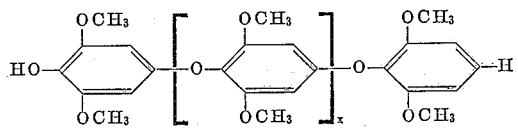

wherein $x$ is an integer greater than 0, which comprises dissolving 2,6-dimethoxyphenol in a solvent and heating the resulting solution in the presence of from 0.5 to 100.0 moles of activated manganese dioxide per mole of 2,6-dimethoxyphenol at a temperature ranging between 20° C. and 360° C. for a period of time ranging between 5 minutes and 25 hours and thereafter recovering said aromatic polyether.

24. Method in accordance with claim 23 wherein the molar ratio of activated manganese dioxide to 2,6-dimethoxyphenol ranges between 3.0–1.0 and 10.0–1.0.

25. Method for preparing aromatic polyethers having the general formula

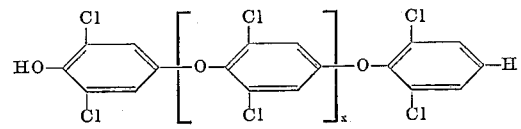

wherein $x$ is an integer greater than 0 which comprises dissolving 2,6-dichlorophenol in a solvent and heating the resulting solution in the presence of from 0.5 to 100.0 moles of activated manganese dioxide per mole of 2,6-dichlorophenol at a temperature ranging between 20° C. and 360° C. for a period of time ranging between 5 minutes and 25 hours and thereafter recovering said aromatic polyether.

26. Method in accordance with claim 25 wherein the molar ratio of activated manganese dioxide to 2,6-dichlorophenol ranges between 3.0–1.0 and 10.0–1.0.

27. Method for preparing aromatic polyethers having the general formula

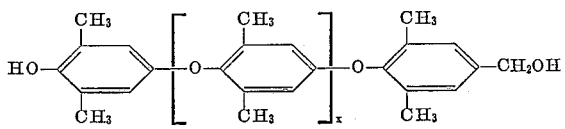

wherein $x$ is an integer greater than 0, which comprises dissolving 2,6-dimethyl-4-hydroxymethylphenol in a solvent and heating the resulting solution in the presence of from 0.5 to 100.0 moles of activated manganese dioxide per mole of 2,6-dimethyl-4-hydroxymethylphenol at a temperature ranging between 20° C. and 360° C. for a period of time ranging between 5 minutes and 25 hours and thereafter recovering said aromatic polyether.

28. Method in accordance with claim 27 wherein the molar ratio of 2,6-dimethyl-4-hydroxymethylphenol to activated manganese dioxide is in the range of 3:1 to 10:1.

29. Method for preparing aromatic polyethers having the general formula

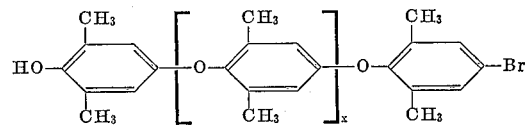

wherein $x$ is an integer greater than 0, which comprises dissolving 4-bromo-2,6-xylenol in a solvent and heating the resulting solution in the presence of from 0.5 to 100.0 moles of activated manganese dioxide per mole of 4-bromo-2,6-xylenol at a temperature ranging between 20° C. and 360° C. for a period of time ranging between 5 minutes and 25 hours and thereafter recovering said polyether.

30. Method in accordance with claim 29 wherein the molar ratio of 4-bromo-2,6-xylenol to activated manganese dioxide is in the range of 3:1 to 10:1.

31. Method for preparing aromatic polyethers having the general formula

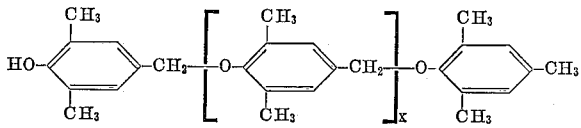

wherein $x$ is an integer greater than 0 which comprises dissolving mesitol in a solvent selected from the group consisting of chloroform and acetone and contacting the resulting solution with 0.5 to 100.0 moles of activated manganese dioxide per mole of mesitol at a temperature in the range of 20° C. to 360° C. for a period of time ranging between 5 minutes and 25 hours and thereafter recovering said aromatic polyether.

32. Method in accordance with claim 31 wherein the molar ratio of activated manganese dioxide to mesitol ranges between 3.0–1.0 and 10.0–1.0.

33. Method for preparing aromatic polyethers having the general formula

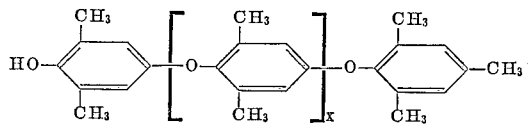

wherein $x$ is an integer greater than 0, which comprises dissolving mesitol in benzene and heating the resulting solution in the presence of from 0.5 to 100.0 moles of activated manganese dioxide per mole of mesitol at a temperature in the range of 20° C. to 360° C. for a period of time ranging between 5 minutes and 25 hours and thereafter recovering aromatic polyether.

34. Method in accordance with claim 33 wherein the molar ratio of mesitol to activated manganese dioxide is in the range of 3:1 to 10:1.

35. Method of preparing 4,4'-dihydroxy-3,3',5,5'-tetramethyldiphenylmethane having the general formula

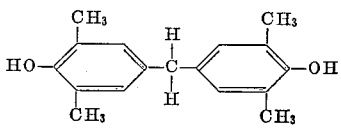

which comprises dissolving mesitol in a solvent and contacting the resulting solution with 0.5 to 100.0 moles of activated manganese dioxide per mole of mesitol at a temperature in the range of 20° C. to 360° C. for a period of time ranging between 5 minutes and 25 hours and thereafter recovering said 4,4'-dihydroxy-3,3'-5,5'-tetramethyldiphenylmethane.

36. Method in accordance with claim 35 wherein the molar ratio of activated manganese dioxide to mesitol ranges between 3.0–1.0 and 10.0–1.0.

37. Method for preparing 4,4'-dihydroxy-3,3',5,5'-tetramethylbiphenyl having the formula

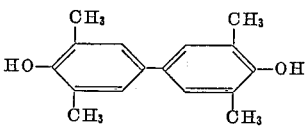

which comprises dissolving 2,6-xylenol in a solvent and contacting the resulting solution with activated manganese dioxide wherein the molar ratio of 2,6-xylenol to activated manganese dioxide is in the range of 2:1 to 100:1 at a temperature in the range of 20° C. to 360° C. for a period of time ranging between 5 minutes and 25 hours and thereafter recovering said 4,4'-dihydroxy-3,3',5,5'-tetramethylbiphenyl.

38. Method in accordance with claim 37 wherein the molar ratio of 2,6-xylenol to activated manganese dioxide is in the range of 3:1 to 10:1.

References Cited by the Examiner

UNITED STATES PATENTS 3,134,753   5/1964   Kwiatek _____ 260—47

FOREIGN PATENTS 613,739   12/1960   Italy.

OTHER REFERENCES

Evans: Quarterly Reviews, vol. 13, pp. 61–70 (1959).

WILLIAM H. SHORT, *Primary Examiner.*